United States Patent [19]

Olson

[11] Patent Number: 4,848,504

[45] Date of Patent: Jul. 18, 1989

[54] CONVERTIBLE WALKING/RIDING GOLF CART

[76] Inventor: John H. Olson, 20739 Hazelnut Ridge Rd., Scotts Mills, Oreg. 97375

[21] Appl. No.: 208,177

[22] Filed: Jun. 17, 1988

[51] Int. Cl.⁴ ............................................. B62B 1/04
[52] U.S. Cl. .................... 180/191; 180/208; 280/DIG. 5; 280/DIG. 6
[58] Field of Search ............... 180/19.1, 208; 280/DIG. 5, DIG. 6

[56] References Cited

U.S. PATENT DOCUMENTS

| | | | |
|---|---|---|---|
| 3,043,389 | 7/1962 | Steinberg | 180/208 |
| 3,329,228 | 7/1967 | Harris | 180/208 |
| 3,434,558 | 3/1969 | Allen | 180/208 |
| 3,485,314 | 12/1969 | Herr | 180/19.1 |
| 3,513,924 | 5/1970 | Jackson | 180/11 |
| 3,648,795 | 3/1972 | Moulton | 180/216 |
| 3,941,398 | 3/1976 | Nelson | 280/DIG. 6 |
| 4,356,875 | 11/1982 | Clune | 180/13 |
| 4,418,776 | 12/1983 | Weirick | 180/19.3 |
| 4,522,281 | 6/1985 | Snider | 180/208 |
| 4,538,695 | 9/1985 | Bradt | 180/19.2 |
| 4,570,731 | 2/1986 | Oaks | 180/19.3 |
| 4,570,732 | 2/1986 | Craven | 180/19.3 |
| 4,573,549 | 3/1986 | Pankow | 180/216 |
| 4,615,406 | 10/1986 | Bottenchein et al. | 180/19.1 |
| 4,657,100 | 4/1987 | Lewis | 180/19.1 |

*Primary Examiner*—Kenneth R. Rice
*Attorney, Agent, or Firm*—Olson & Olson

[57] ABSTRACT

A convertible walking/riding power driven golf cart includes three detachable units; namely, a drive unit having a frame supported on wheels connected to a battery operated motor; a steering and golf bag support unit connected detachably to the drive unit and having releasable golf bag connectors and a handle bar mounting a speed control and a brake control; and a riding unit having a wheel-supported platform connected detachably to the drive unit for adjustment between an operative position extending horizontally rearward from the drive unit for supporting a person on the platform for riding, and a storage position disposed vertically closely adjacent the drive unit to allow a person to walk behind the drive unit while grasping the handle bar. The three units are quickly and easily detached from each other for storage and transport in the trunk of an automobile.

7 Claims, 2 Drawing Sheets

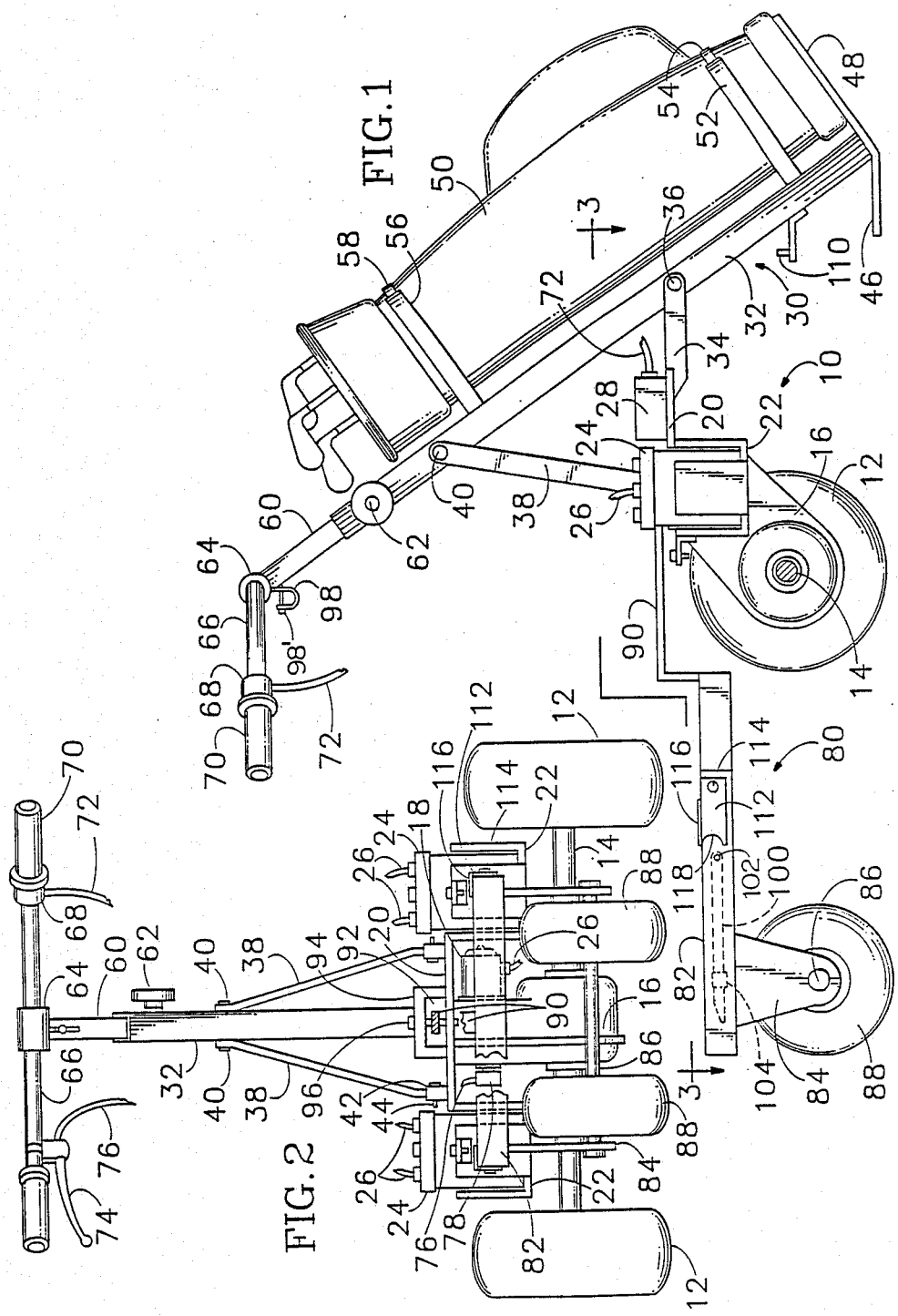

CONVERTIBLE WALKING/RIDING GOLF CART

BACKGROUND OF THE INVENTION

This invention relates to power golf carts, and more particularly to a collapsible power golf cart that may be used selectively in walking and riding modes and is collapsible for storage and transport in the trunk of a vehicle.

There are many golfers whose health is such that although they need and desire the exercise afforded by walking, there are conditions under which it is necessary at times to be able to ride. For example, a golfer may be quite able ordinarily to walk flat or moderately inclined fairways, but on occasion cannot do so, and usually is unable to walk up steeply inclined fairways.

There are presently available for use a wide variety of types of collapsible power golf cart that may be used either to walk behind or to ride. The walking type of collapsible power golf carts is exemplified in such U.S. Patents as Nos. 4,657,100; 4,615,406; 4,570,732; 4,570,731; 4,418,776; and 4,356,875. None of these walking type power carts is capable of accommodating riding.

The riding type of collapsible power golf cart is exemplified in such U.S. Patents as Nos. 4,573,549; 4,538,695; 4,522,281; 3,648,795; 3,513,924; 3,434,558; 3,329,228; and 3,043,389. None of these riding type power golf carts permits the alternative of walking.

Thus, there has not been provided heretofore a collapsible power golf cart that is convertible during a round of golf selectively to walk behind or to ride upon.

SUMMARY OF THE INVENTION

This invention provides a power golf cart that is convertible between one position in which a wheeled platform extends rearwardly of a power driven, wheel supported frame for supporting a person for riding, and a second position in which the wheeled platform is supported by the frame in retracted position to allow a person to walk behind the frame.

It is the principal objective of this invention to provide a collapsible power golf cart that is convertible selectively for between walking and riding modes.

Another object of this invention is the provision of a collapsible powered golf cart of the class described that is capable of assembly and disassembly with speed and facility for transport in the trunk of a vehicle.

Still another objective of this invention is to provide a collapsible powered golf cart of the class described in which a riding platform is adjustable between a position for supporting a person for riding and a position of storage on the cart for allowing a person to walk behind the cart.

A further objective of this invention is the provision of a collapsible powered golf cart of the class described that is of simplified construction for economical manufacture, maintenance and repair.

These and other objects and advantages of this invention will appear from the following detailed description, taken in connection with the accompanying drawings of a preferred embodiment.

BRIEF DESCRIPTION OF THE DRAWINGS

FIG. 1 is a side elevation of a convertible walking/riding golf cart embodying the features of this invention, the cart being shown adjusted to the riding mode.

FIG. 2 is a rear elevation as viewed from the left in FIG. 1, parts being broken away to disclose structural details and the golf bag removed for clarity.

DESCRIPTION OF THE PREFERRED EMBODIMENT

Figure 4:
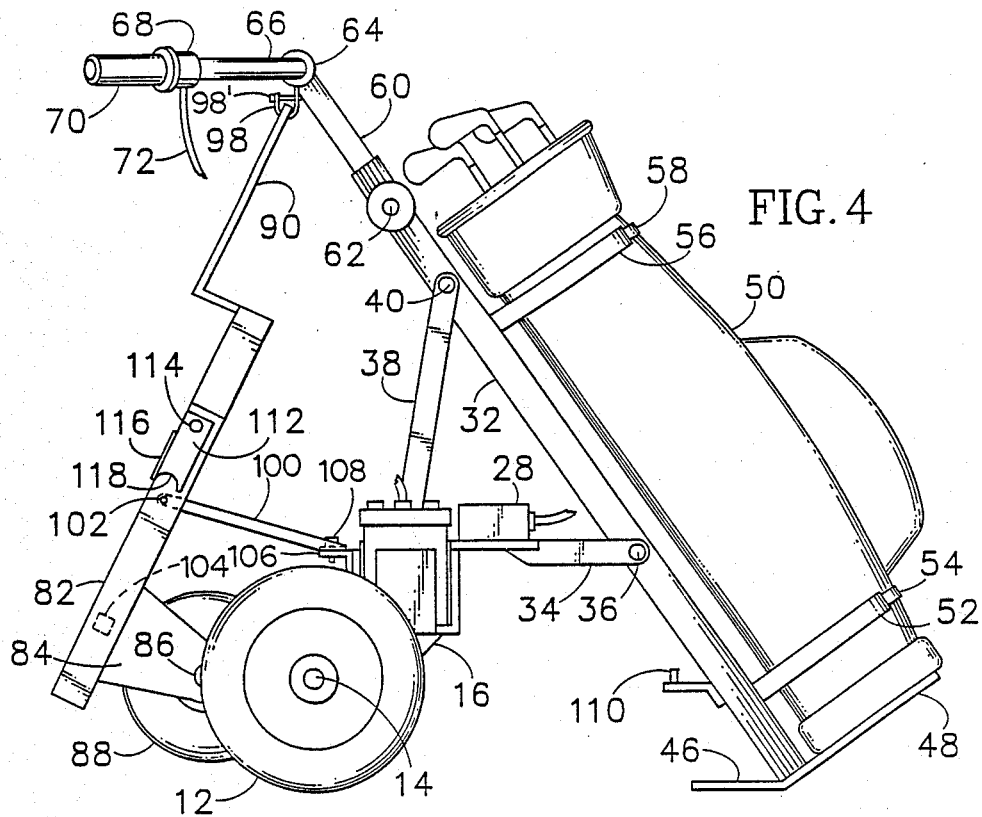
FIG. 4 is a side elevation, similar to FIG. 1, showing the cart adjusted to the walking mode.
Figure 3:
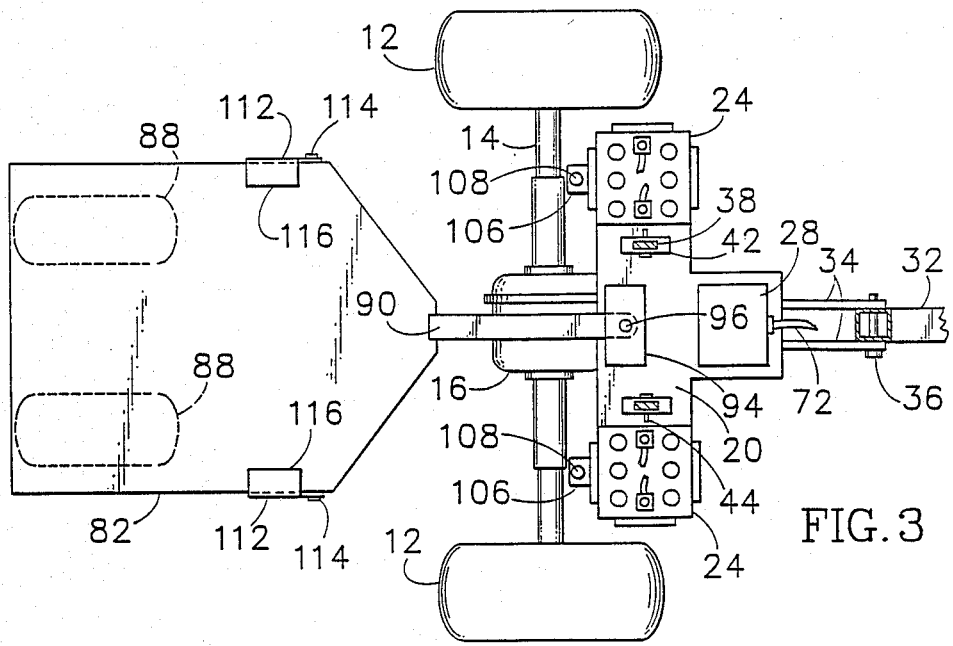
FIG. 3 is a horizontal section taken on the line 3—3 in FIG. 1, the golf bag being removed for clarity.

The convertible walking/riding golf cart of this invention is formed of three basic units; namely, a drive unit, a golf bag support unit and a riding unit. These units are releasably interconnected for cooperative association in the operative configurations and are readily disconnected from each other for convenient manipulation for storage and transport in the trunk of a conventional automobile.

The drive unit 10 includes a pair of laterally spaced wheels 12 mounted on the opposite ends of a transverse axle 14. The axle extends through the housing 16 of a transmission which is coupled to an electric drive motor 18 mounted on the housing.

The transmission housing 16 supports a transverse frame 20 provided at its opposite ends with downwardly offset battery compartments 22 configured to removably support the pair of batteries 24. Electrical conductors 26 connect the batteries to the electric drive motor through an electronic controller 28 mounted on the frame.

A golf bag support unit 30 includes an elongated hollow post 32, preferably formed of square tubing. The post is secured to the frame 20 by means of a pair of bottom brackets 34 extending forwardly from the frame and secured detachably to opposite sides of the post by means of quick disconnect pins 36. The post also is secured to the frame by means of a pair of upper brackets 38. The upper ends of these brackets are secured releasably to the post by means of quick disconnect pins 40. The brackets diverge downwardly and their lower ends are received in laterally spaced sockets 42 on the frame 20. Quick disconnect pins 44 secure the lower ends of the brackets releasably in the sockets.

The post 32 thus is secured detachably to the frame 20 in an upwardly and rearwardly inclined disposition.

The bottom end of the post 32 mounts a rearwardly extending skid plate 46 by which the forward, lower end of the post may be rested upon the ground.

Projecting forwardly from the skid plate is an integrated golf bag support plate 48 which serves to support the bottom end of a golf bag 50. The bag extends upwardly therefrom along the forward surface of the post 32. A U-shaped retainer frame 52 is secured to the post adjacent the lower end thereof and extends forwardly to capture the lower portion of the golf bag. A strap 54 interconnects the spaced terminal ends of the retainer frame 52 and extends across the outer side of the golf bag to secure the latter releasably to the post.

In similar manner, a U-shaped retainer frame 56 is secured to the post in a position adjacent the upper end of the golf bag, to confine the latter therein. The upper portion of the golf bag is retained in the frame by means of a strap 58. The golf bag may be removed from the post simply by releasing one end of each of the straps 54 and 58, as will be understood.

The post 32 serves the additional function of steering the golf cart. In the embodiment illustrated, an upper telescopic post 60 is received slidably within the hollow post 32 for longitudinal adjustment relative thereto. A clamp screw 62 extends through a wall of the post 32 for releasable engagement with the upper telescopic post 60 to secure the latter in any desired position of longitudinal adjustment.

The upper end of the telescopic post 60 mounts a friction sleeve 64 in which a handle bar 66 is secured for rotational adjustment about the axis of the sleeve.

The handle bar illustrated is of the bicycle or motorcycle type provided with a pair of laterally spaced, rearwardly extending sections. The terminal end of one of the sections mounts a speed control 68 operated by a rotary handle 70 to effect the movement of a flexible speed control cable 72. This cable extends to the electronic controller 28, and functions by rotational manipulation of the handle 70 to operate the electronic controller to vary the speed of the drive motor 18.

The opposite end section of the handle bar 66 mounts a brake control lever 74 which is connected through flexible cable 76 to a brake control 78 on the transmission 16.

The third component of the convertible golf cart of this invention is a riding unit 80. This unit includes a platform 82 provided with laterally spaced, downwardly extending brackets 84 which mount the opposite ends of a transverse axle 86. The axle mounts a pair of laterally spaced wheels 88.

Extending forwardly from the front end of the platform 82 is an elongated, upwardly offset tongue 90. The forward end of the tongue is configured for removable reception in a guide slot 92 formed between the frame 20 and an upstanding, inverted U-shaped tongue guide 94 on the frame. A quick disconnect pivot pin 96 extends through aligned openings in the tongue guide 94, tongue 90 and frame 20, to releasably secure the tongue to the frame for limited articulation of the tongue both horizontally and vertically. It is by this means that the riding unit 80 and drive unit 10 are movable as an integrated unit in any direction over uneven terrain.

Means also is provided for adjusting the riding unit to a storage position closely adjacent the drive unit 10 when it is desired to operate the golf cart in the walking mode. In the embodiment illustrated, a suspension hook 98 extends rearwardly from the upper telescopic post 60 for the releasable reception of the pivot opening at the forward end of the tongue 90, as illustrated in FIG. 4. The riding unit 80 thus is suspended from the hook and hangs downward therefrom with the wheels 88 positioned closely adjacent the frame 20. A quick disconnect pin 98' releasably secures the tongue in the hook.

A pair of anchor bars 100 are mounted pivotally at one end to the underside of the platform 82 on pivots 102. The bars are adjustable between a storage position retained in spring clips 104 under the platform and an operative position extending forwardly from the underside of the platform. the forward end of each bar is provided with an opening for registration with an opening in a bracket 106 projecting rearwardly from each battery compartment 22. A quick release pin 108 extends retractably through the aligned openings to secure the anchor bars to the frame 20. The riding unit 80 thus is secured in the storage position closely adjacent the drive unit so as not to interfere with normal walking behind the golf cart.

The wheels 88 of the riding unit are positioned a distance rearwardly and upwardly from the drive wheels 12. Thus, when the golf cart is driven forwardly in the walking mode, the golf bag support post 32 may be tilted rearwardly until the wheels 88 also engage the ground behind the drive wheels 12. The golf cart thus is supported on four wheels for maximum stability.

Means preferably is provided for utilizing the riding unit as a carrier for the drive unit 10 in the event that through inadvertence the batteries 24 had not been charged sufficiently to operate the drive unit to the completion of the golf round. To this end, a tongue-connecting pin 110 is carried on a bracket extending rearwardly from the lower portion of the post 32, for releasable reception of the opening in the forward end of the tongue 90.

A pair of axle saddle bars 112 are mounted pivotally on opposite sides of the platform 82 by pivot pins 114. Inwardly extending stop bars 116 on the saddle bars 112 are configured to abut the upper surface of the platform 82 when the saddle bars are rotated upwardly about the pivot pins 114 to a position extending perpendicular to the platform. The upper ends of the saddle bars 84 are contoured to provide arcuate saddles 118 in which to receive the axle 14 of the drive unit.

The riding unit thus supports the drive unit and golf bag support unit upon it, whereby the assembly may be wheeled manually on the wheels 88 of the riding unit, either to a transporting vehicle or to a battery charger.

From the foregoing it will be readily apparent that the convertible walking/riding golf cart of this invention may be disassembled for convenient storage and transport in the trunk of a conventional automobile. This is achieved simply by retraction of the quick disconnect pins 36, 40, 44 and 96 or 98' and 108 to separate the three basic units from each other. If desired, the batteries may be removed from the compartments 22 to minimize the weight of the drive unit and thus facilitate lifting of the drive unit to and from a trunk. The golf bag 50 also may be removed from the post 32. In addition, the upper telescopic post 60 may be retracted fully into the post 32, or removed, to minimize the length of the handle bar and golf bag support unit.

In preparation of use of the golf cart, the components are removed from the automobile trunk. The elongated hollow post 32 of the golf bag support unit then is secured to the drive unit 10 by connecting the post 32 to the bottom brackets 34 by the quick disconnect pins 36. The brackets 38 then are secured at their lower ends in the sockets 42, by the quick disconnect pins 44, and the upper ends of the brackets are secured to the post 32 by the quick disconnect pins 40. The golf bag 50 is secured in position on the post 32 by the straps 54 and 58.

Assuming the golf cart is first to be utilized in the walking mode, the riding unit 80 is secured in the storage position illustrated in FIG. 4, by engaging the opening in the front end of the tongue 90 in the suspension hook 98, and the anchor bars 100 swung forwardly and secured to the brackets 106 by the pins 108.

The golfer then manipulates the power cart by grasping the laterally spaced end sections of the handle bar 66 and rotating the speed control handle 70 to energize the drive motor 18. The wheels 12 of the drive unit thus are rotated in the forward moving direction, whereupon the golf bag support post 32 automatically is rotated in the counterclockwise direction about the axis of the axle 14. The lower end of the post 32 thus is moved upwardly a substantial distance above the ground and the handle bar is moved rearward in the grasp of the golfer. The wheels 88 of the riding unit may be brought into engagement with the ground to limit further rearward tilting of the support post 32 and golf bag 50 and thereby achieve maximum stability of the golf cart. There is ample distance between the platform 82 of the riding unit 80 and the golfer to permit the golfer to walk with normal stride behind the golf cart.

The golfer may steer the golf cart to the right or left simply by manipulating the handle bar in the appropriate manner. When it is desired to stop the forward movement of the golf cart, the golfer merely rotates the speed control handle 70 in the direction to deactivate the drive motor 18. Ordinarily, the application of the brake lever 74 is unnecessary to retain the golf cart in stationary position. However, the brake control lever may be used to provide quicker stopping when desired.

When the golfer approaches a steeply inclined fairway, or for any other reason finds it desirable or necessary to switch to the riding mode, the anchor bars 100 are uncoupled from the frame 20 and swung under the platform 82 to the storage position in the spring clips 104. The pins 108 are stored in the brackets 106 for subsequent use in again securing the anchor bars. The riding unit then is removed from its suspension on the hook 98. The tongue 90 then is inserted into the guide slot 92 and the quick disconnect pivot pin 96 installed to interconnect the tongue and the frame 20. The riding unit thus is switched to the operative position in which the golfer may stand upon the platform 82 in the riding mode.

To propel the golf cart forwardly in the riding mode, the golfer, standing upon the platform, grasps the handle bar 66 and rotates the speed control handle 70 in the direction to activate the drive motor 18. As before, the forward driving motion of the wheels 12 causes the elongated hollow post 32 and supported golf bag 50 to rotate counterclockwise about the axle 14. The skid plate 46 thus is raised above ground and the handle bar moved rearwardly toward the golfer standing on the platform.

In the event the golfer once again desires to use the golf cart in the walking mode, the riding unit 80 is transferred back to the storage position illustrated in FIG. 4. This switching between walking and riding modes may be accomplished as often as desired throughout a round of golf, and with speed and facility, as will be apparent.

From the foregoing, it will be recognized that the present invention provides a power golf cart of simplified construction which may be converted with speed and facility between walking and riding modes, as often as desired during a round of golf. The three basic units of the assembly are readily separated from each other for convenient storage and transport in the trunk of an automobile, and as readily assembled into an integrated golf cart for use selectively in walking and riding modes.

It will be apparent to those skilled in the art that various changes may be made in the size, shape, type, number and arrangement of parts described hereinbefore. For example, the riding platform 82 may be arranged to be swung upward from a pivot at the front end of the tongue 90 and the rear end of the platform 82 secured in the storage position of FIG. 4, by any suitable latch means. For this purpose it may be desirable to mount the brackets 84 for sliding adjustment along the platform in order to move the wheels 88 downward toward the tongue 90 to a position of better balance. As another modification, the speed control assembly 68, 70 and 72 may be replaced with other, completely electrical system, such as is used in powered wheelchairs. The bicycle type handle bar may be replaced with a single handle, in the manner of conventional manual golf carts. The telescopic handle bar post 60 may be omitted, as may be the brake system. The skid plate 46 may be replaced with a wheel. These and other modifications and changes may be made, as desired, without departing from the spirit of this invention and the scope of the appended claims.

I claim:

1. A convertible walking/riding golf cart, comprising:
    (a) a drive unit comprising a frame, a pair of laterally spaced drive wheels engaging and supporting the frame for movement over the ground, an electric drive motor mounted on the frame and connected to said wheels, and electric battery means mounted removably on the frame and connected detachably to said motor,
    (b) a golf bag-supporting unit comprising an elongated post secured detachably to and spaced forwardly of the frame and extending angularly upward and rearward from its lower end forwardly of the drive unit, and golf bag mounting means on the post for detachably securing a golf bag thereto in an inclined position substantially parallel to the elongated post,
    (c) ground-engaging means on the lower end of the post for removably supporting the lower end of the post on the ground, the ground-engaging means cooperating with the spaced drive wheels to support the vehicle on the ground in free-standing condition,
    (d) hand-gripping steering means on the upper end of the post for manually pivoting the post about the axis of the drive wheels for raising the ground-engaging means off the ground and controlling the direction of movement of the power unit over the ground, and
    (e) a riding unit comprising a person-supporting platform having front and rear ends, a pair of platform-supporting wheels, means mounting the wheels adjacent the rear end of the platform, and connecting means on the front end of the platform the rear side of the drive unit frame for detachably connecting the platform to the frame in an operative position extending horizontally rearward from the frame for articulation of the platform and frame horizontally and vertically relative to each other for supporting a person on the platform for movement over the ground, and storage connector means on the rearward side of the frame and post for detachably securing the platform in a storage position extending vertically closely adjacent the rearward side of the frame and post to allow operation of the cart by a person walking behind and gripping the steering means.

2. The convertible walking/riding golf cart of claim 1 wherein the ground engaging means comprises a skid plate.

3. The convertible walking/riding golf cart of claim 1 wherein the steering means comprises a handle bar at the upper end of the golf bag supporting post.

4. The convertible walking/riding golf cart of claim 1 wherein the steering means comprises a telescopic post.

5. The convertible walking/riding golf cart of claim 1 wherein the connecting means on the frame and post includes a tongue member on the wheel-supported platform extending forwardly therefrom for releasably connection at its forward end to the drive unit frame.

6. The convertible walking/riding golf cart of claim 5 including pivot means releasably interconnecting the tongue member and drive unit frame for allowing relative horizontal and vertical movement of said tongue member and drive unit frame.

7. In combination with a portable powered golf cart having a wheeled frame power driven by an electric motor and controlled by a hand-gripping handle extending rearwardly of the frame for manually controlling movement of the cart over the ground by a person walking behind, a riding unit comprising a person-supporting platform having front and rear ends, a pair of platform-supporting wheels, means mounting the wheels adjacent the rear end of the platform, and connecting means on the front end of the platform and the rearward side of the wheeled frame for detachably connecting the platform to the frame in an operative position extending horizontally rearward from the frame for articulation of the platform and frame horizontally and vertically relative to each other for supporting a person on the platform for movement over the ground, and storage connector means on the rearward side of the frame for detachably securing the platform in a storage position extending vertically closely adjacent the rearward side of the frame to allow operation of the cart by a person walking behind and gripping the handle.

* * * * *